No. 732,400. Patented June 30, 1903.

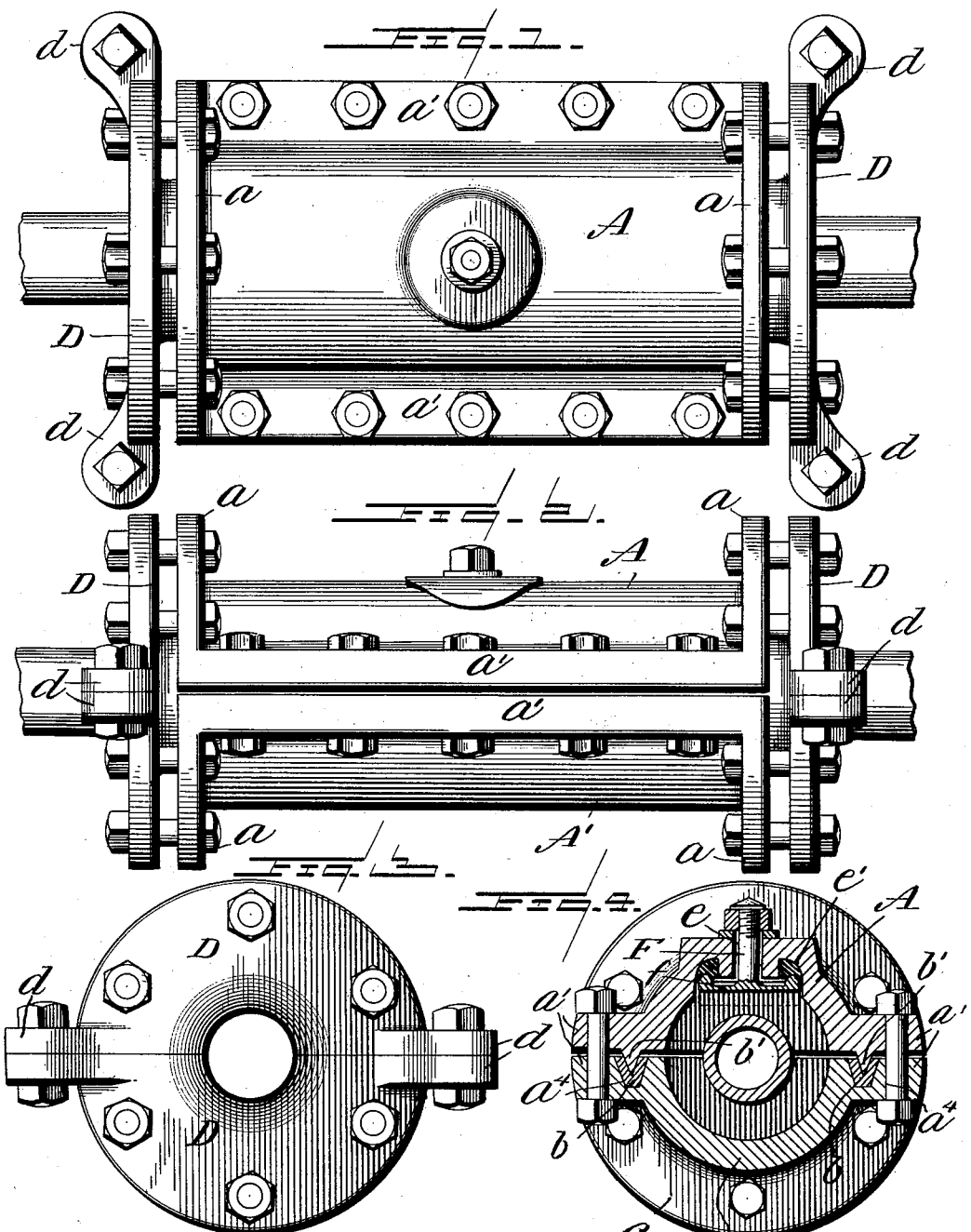

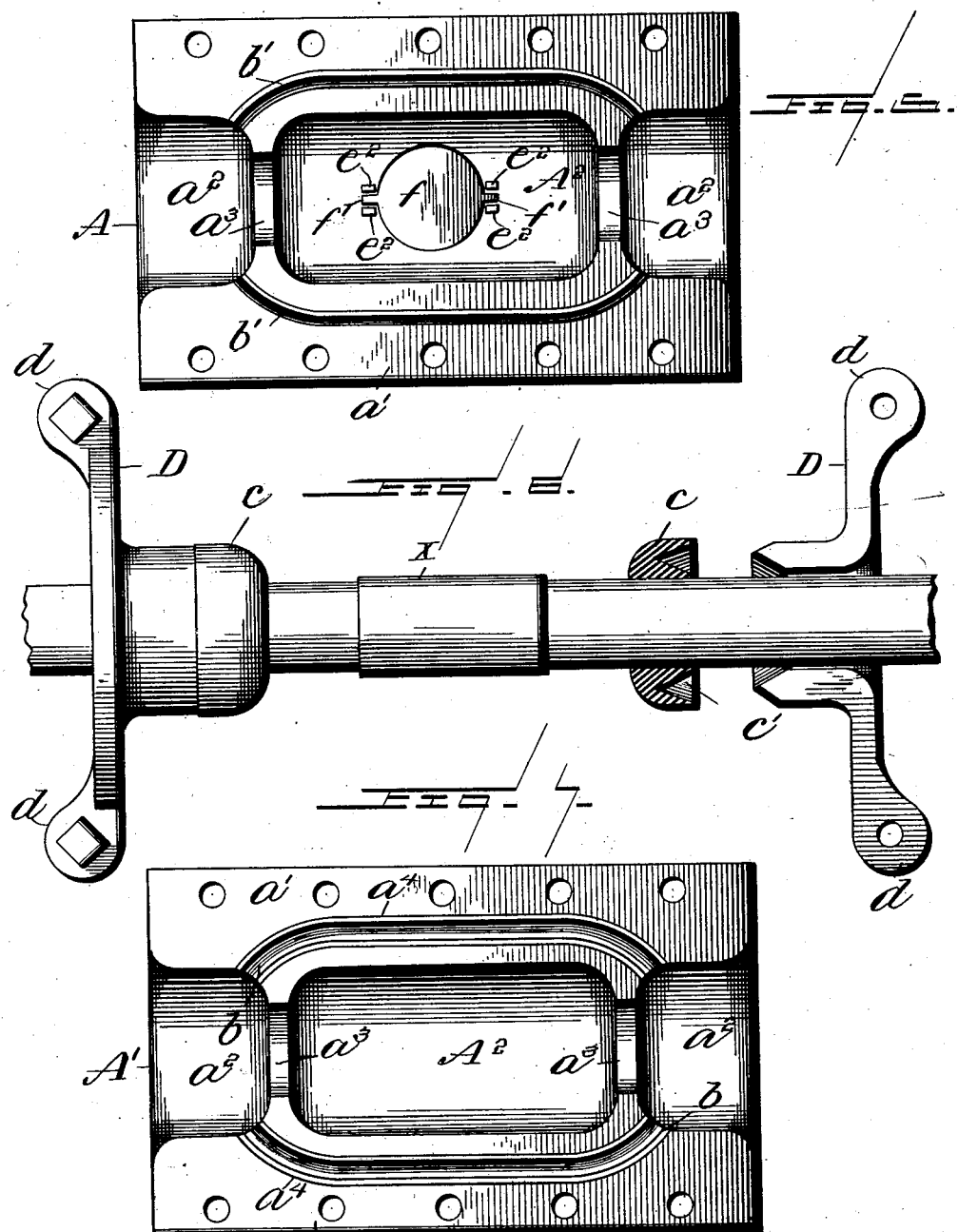

UNITED STATES PATENT OFFICE.

SOLOMON R. DRESSER AND ARTHUR B. HENRY, OF BRADFORD, PENNSYLVANIA; SAID HENRY ASSIGNOR TO SAID DRESSER.

REPAIR-SLEEVE FOR FLUID-CONDUCTING PIPES.

SPECIFICATION forming part of Letters Patent No. 732,400, dated June 30, 1903.

Application filed April 10, 1903. Serial No. 152,038. (No model.)

*To all whom it may concern:*

Be it known that we, SOLOMON R. DRESSER and ARTHUR B. HENRY, citizens of the United States, residing at Bradford, in the county of McKean and State of Pennsylvania, have invented certain new and useful Improvements in Repair-Sleeves for Fluid-Conducting Pipes; and we do hereby declare the following to be a full, clear, and exact description of the invention, such as will enable others skilled in the art to which it appertains to make and use the same.

Our present invention relates to blind conduit-pipes; and it consists more particularly in a repair-sleeve for closing breaks and leaks in said pipes, more especially such pipes as are employed in the transmission of natural gas. In the practical use of such pipes leaks will be found to occur by reason of cracks or other defects in the sleeve-coupling and other parts of the pipe, and as the gas is often forced through the pipes at a very high pressure, sometimes reaching four hundred pounds to the square inch, the repairing of such breaks or leaks is a matter of considerable difficulty.

In the accompanying drawings we have illustrated the best form in which we have contemplated embodying our invention, and our invention is disclosed in the following description and claims.

In the drawings, Figure 1 is a top or plan view of our improved repair-sleeve for gas-pipes. Fig. 2 is a side elevation of the same. Fig. 3 is an end view of the same. Fig. 4 is a transverse vertical section. Fig. 5 is an under side view of the upper half of the sleeve. Fig. 6 is a view of the pipe with the end piece and gasket thereon, one of the gaskets being in section. Fig. 7 is a view of the upper side of the lower half of the sleeve portion.

The main body of the device is composed of two parts A A', of semicylindrical form. At each end is a flange $a$, extending at right angles from the main body. These flanges connect with flanges $a'$, extending along the longitudinal edges of the parts. The flanges are perforated to receive bolts, and by this means the two parts can be placed over or around the defective pipe and be secured together thereon.

The inner faces of the two parts A A' are each provided with the recesses $a^2 a^2$ at each end and with the central recess $A^2$. The end recesses are separated from the central recess by a narrow wall, which is cut away at $a^3$ to closely fit the pipe to be repaired. The lower part A' is also provided with the groove $a^4$. The central portion of this groove is parallel with the central recess $A^2$, while the ends are curved inwardly to the inner rounded corners of the recesses $a^2 a^2$, as shown in the drawings. The grooves $a^4$ are fitted with a V-shaped gasket or packing $b$, of rubber or other preferred material. The upper part A is provided with downwardly-extending wedge-shaped or V projections $b'$, which extend from one recess $a^2$ to the other, following the configuration of the grooves $a^4$. When the two parts are placed together and secured by bolts passing through the flanges $a'$, a perfectly gas-tight joining is obtained.

In applying our device to a defective pipe the parts A A' are placed upon and secured to the pipe, so that the leak or break shall come within the space formed by the recesses $A^2 A^2$. These recesses are made sufficiently large to enable the device to be placed over the couplings employed in pipes of this character, one of which is shown in Fig. 6 at X. After the parts A A' are in position rubber gaskets $c$ are placed in the recesses $a^2 a^2$ and the end pieces D D are then put in position. These end pieces are each made in two pieces and are provided with ears $d d$, whereby they are connected by bolts after having been placed upon the pipe. After having been placed in position the end pieces are connected with the parts A A' by bolts passing through the same and through the flanges $a a$. As the nuts upon said bolts are tightened the end pieces force the gaskets $c$ firmly against the inner end of the grooves $a^4 a^4$, closing the ends of the grooves as well as the ends of the sleeve and preventing all escape of gas at such ends. In order to secure the best results, we prefer to provide the gaskets $c$ with a V-shaped groove $c'$ in their outer ends and to make the inner ends of the inwardly-extending tubular projection of the end pieces of a wedge-shaped form to engage said groove. By this construction the act of forcing the end pieces into position causes the wedge-shaped ends to force the walls of the groove outwardly against the inner walls of the recesses $a^2$ and also inwardly against the pipe. We also prefer to form the packing in the grooves $a^4$ with a like groove in its upper surface to receive the wedge-shaped projection $b'$.

In placing our repair device upon pipes when the gas or other fluid passing through the same is under very high pressure it is very difficult to draw the end pieces into position and secure an effective closing against such pressure. In order to avoid this, we provide the part A with a vent and a valve for closing the same. The construction of this device is best shown in Fig. 4.

The sleeve-section A is provided with an opening $e$, communicating with the recess $A^2$. Within the recess a groove $e'$ is formed around the opening $e$ and the same is filled with packing. The valve F is formed in the shape of a bolt provided with a head $f$ of disk form, and this is inserted in the opening $e$ from the inside of the sleeve. The body of the bolt is considerably smaller than the opening, and the head of the same is provided at or near its periphery with an upwardly-extending flange to engage the packing. At two opposite points the head $f$ is provided with outwardly-extending projections $f'\ f'$ for engaging the lugs or projections $e^2\ e^2$ on the interior of the section A adjacent to the head of the bolt. By loosening the nut on the bolt, forcing the same inwardly and turning it slightly in either direction, the projections $f'\ f'$ are caused to engage two of the lugs $e^2\ e^2$, which hold the head away from the packing and permit the escape of gas or other fluid from the interior of the sleeve, relieving the ends from nearly if not all pressure. When the ends have been secured tightly in place, the bolt F is turned slightly, so that the projections $f'\ f'$ are moved off from the lugs $e^2\ e^2$. The pressure within the sleeve will then seat the head against the packing, and by tightening the nut the head is forced tightly against its packing and the valve permanently closed.

While we have described our device as employed in the repairing of gas-pipes, it is obvious that it may be employed for repairing any pipes used for conducting any fluid under pressure.

The outer ends of the grooves $a^4$ are closed by the gaskets $c$, which effectually prevents any leakage from the interior of the sleeve.

What we claim, and desire to secure by Letters Patent, is—

1. A repair-sleeve for fluid-conducting pipes, comprising a divided sleeve for inclosing the pipes, having longitudinally-disposed packing-grooves, packing for closing the interior of the said sleeve and the packing-grooves and securing means for said closing packing, substantially as described.

2. A repair-sleeve for fluid-conducting pipes, comprising a divided sleeve for inclosing the pipe having end recesses and longitudinally-disposed packing-grooves, and means for closing the end recesses including packing for closing the ends of the said packing-grooves, substantially as described.

3. A repair-sleeve for fluid-conducting pipes, comprising a divided sleeve for inclosing the pipe, having end recesses and packing-grooves extending longitudinally of the sleeve, said packing-grooves having inwardly-curving ends terminating in the inner part of the end recesses, end pieces for closing the end recesses and packing interposed between the end pieces and the inner end of the end recesses whereby the end recesses and packing-grooves are closed with the minimum amount of packing, substantially as described.

4. A repair-sleeve for fluid-conducting pipes, provided with a vent, of a pressure-valve for closing the same and means for holding the valve open while closing the ends of the sleeve, substantially as described.

5. A repair-sleeve for fluid-conducting pipes, comprising a divided sleeve and end-closing means, said sleeve being provided with a vent and a pressure-valve for closing the same, means for holding the valve open during the closing of the ends and means for permanently securing the said valve when closed, substantially as described.

6. A repair-sleeve for fluid-conducting pipes, comprising a sleeve provided with a vent and a pressure-valve having a disk-like head provided with outwardly-extending projections, projections on the interior of the sleeve to engage the projections of the valve and hold the valve open against the pressure of the fluid within the sleeve, substantially as described.

7. A repair-sleeve for fluid-conducting pipes, comprising the divided sleeve, end pieces for securing the ends of the sleeve, the vent in the sleeve and pressure-valve for closing the same, means for holding the valve open when desired and means for permanently securing the valve in closed position, substantially as described.

In testimony whereof we affix our signatures in the presence of two witnesses.

S. R. DRESSER.
ARTHUR B. HENRY.

Witnesses:
FRED A. MILLER,
J. C. PEARSON.